Oct. 24, 1939.                S. O. LINDAHL                2,176,972
                         PHOTO FLASH SYNCHRONIZER
                           Filed June 19, 1937
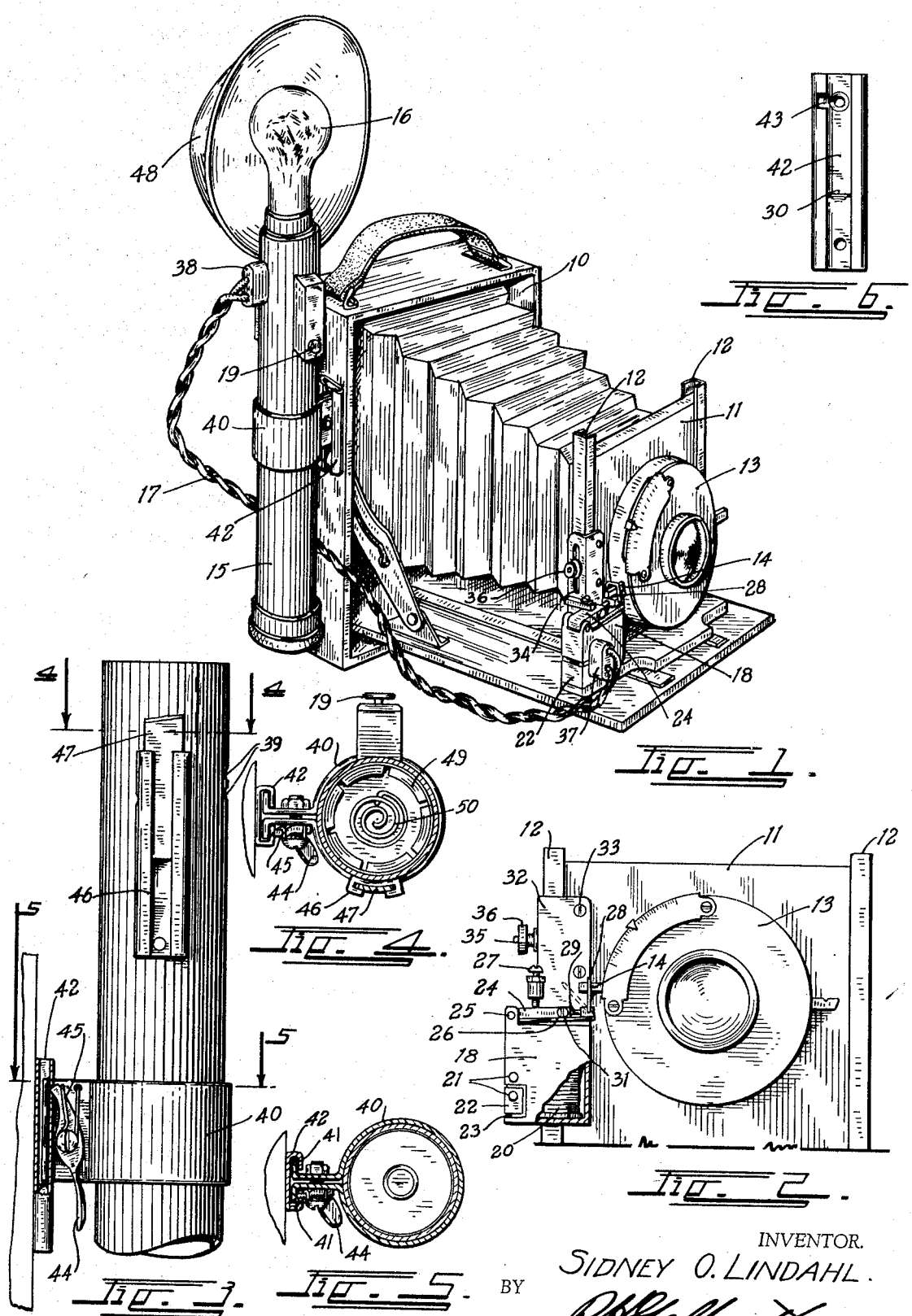
INVENTOR.
SIDNEY O. LINDAHL.
BY
ATTORNEY.

Patented Oct. 24, 1939

2,176,972

UNITED STATES PATENT OFFICE 2,176,972

PHOTO FLASH SYNCHRONIZER

Sidney O. Lindahl, Denver, Colo.

Application June 19, 1937, Serial No. 149,134

3 Claims. (Cl. 95—53)

This invention relates to a photo flash synchronizer and has for its principal object the provision of a highly efficient, electrically-operated, device which will ignite a photo-flash bulb and accurately operate a camera shutter in proper synchronism with said ignition.

Other objects of the invention are to provide a photo flash synchronizer which will be adjustable to accommodate shutters and shutter levers of various types and sizes; to provide means whereby a battery container can be quickly attached to or detached from a camera; to provide a bulb socket in which the photo flash bulb can be quickly and easily inserted or removed without the necessity for screwing and unscrewing it; to provide a shutter operating mechanism which will be sufficiently small and sufficiently compact to fold with the usual lens board into the camera so that it may remain permanently in place; and to provide efficient and accurate means for regulating the time interval between the flow of current to the photo flash bulb and the shutter operation so that the latter will occur in exact synchronism with the flash.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a perspective view illustrating the invention in use.

Fig. 2 is an enlarged detail view of a camera lens board with the invention in place thereon.

Fig. 3 is a detail view illustrating the method of attaching the battery case to the camera.

Fig. 4 is a cross section through the upper extremity of the battery case, taken on the line 4—4, Fig. 3.

Fig. 5 is a similar cross section, taken on the line 5—5, Fig. 3.

Fig. 6 is a detail view illustrating the battery case attachment clip.

In the drawing a typical folding camera of the type used in newspaper work is illustrated at 10 with its lens board at 11, lens board pillars at 12, shutter mechanism at 13, and shutter operating lever at 14.

The invention comprises a cylindrical battery case 15 for containing "flash light" dry cells. The cells furnish current to a flash bulb 16 and, through a flexible conductor cord 17 to an electromagnetic shutter operating mechanism 18. The current to the lamp 16 and the mechanism 18 is controlled by means of a push button switch 19. The shutter operating mechanism and the lamp 16 are connected in parallel.

The shutter operating mechanism comprises a relatively flat rectangular iron case 18 enclosing an electromagnet coil 20. Current is supplied to the coil 20 from two connection posts 21, one of which is connected to one terminal of the coil and mounted on an insulating block 22 insulated from the case by means of suitable insulation 23. The other of the contact posts 21 is grounded to the case 18, to which the other terminal of the coil is also grounded.

An armature arm 24, preferably of non-magnetic material, is hinged at 25 to the case. The armature arm carries an iron armature plate 26 directly over the pole of the magnet 20 and over the upper edge of the case, which forms the other pole of the magnet, so that it may be attracted thereby. The arc of movement of the armature block 24 can be adjusted by means of a limit set screw 27.

The shutter operating lever 14 of the camera is engaged by means of a bail 28 which is hingedly mounted on the extremity of an armature extension member 29. The extension member extends into the extremity of the armature arm 24 and can be set at any desired degree of extension therefrom by means of a suitable set screw 31.

The hinged bail 28 and the extension member 29 allow the position of the bail to be varied to suit cameras, shutters and lens boards of various types and also allows the bail to be quickly and easily swung away from the shutter lever 14 to allow hand operation of the shutter when desired.

The entire mechanism 18 is carried on an angle plate 32 which is permanently secured to the lens board 11 by means of suitable attachment screws 33. The flange of the plate 32 overlaps the lens board pillar 12 and is provided with a slotted opening 34 for receiving the usual lens board elevating screw 35. By this arrangement, the entire mechanism moves upwardly and downwardly with the lens board and both can be locked in any desired elevated position by means of a clamp nut 36 on the screw 35 which engaged the flange of the angle member 32.

The conductor cord 17 terminates at its lower extremity in a female connection block 37 which receives the terminal posts 21 and at its other extremity in a male connection block 38, the prongs of which fit into contact receptacles 39 in the side of the battery case 15. This enables the operator to quickly connect or disconnect the cord when it is desired to fold the camera.

The battery case is encircled by a clamping band 40, the extremities of which are bent to form a T-shaped extremity 41. The extremity 41 is slidably received in a channel member 42 which is permanently attached to the side of the camera 10. The latter member is formed with a boss 30 for limiting the amount of insertion of the extremity 41 and with a locking notch 43, into which the extremity of a latch 44 engages. The latch is a pivoted member, thumb operated, having a spring 45 which constantly urges its extremity toward the channel member 42.

With this arrangement, the battery case can be slid downwardly into the channel member 42 and will be automatically locked therein when the latch member 44 engages the notch 43. This engagement can be easily released by the thumb of the operator when it is desired to remove the battery case. The battery case is also provided with a similar channel member 46 for receiving the stem 47 of one of the usual photo-flash reflectors 48.

The upper extremity of the battery case contains an electric bulb receptacle. This receptacle consists of an annular series of spring blades 49 which grip the sides of the screw lamp base without the necessity for screwing or unscrewing the lamp. The bottom contact of the lamp is made, by means of a helical compression spring 50 positioned in the bottom of the receptacle.

The battery case is only frictionally engaged by the band 40 so that it may be raised, lowered or turned to position the bulb and reflector as desired by the operator.

In use, the operator grasps the battery case in his right hand with his forefinger overlying the button 19. When ready for the picture, he simply depresses the button with assurance that both the photo flash lamp and the shutter operating mechanism will operate in perfect synchronism with each other.

It is desired to call particular attention, to the limit set screw 27. The shutter operating lever of the usual shutter has a relatively wide arc of movement before the shutter is actually released and after release the lever is returned to the initial point by means of a spring. The shutter operating mechanism is so positioned that the shutter spring maintains the bail 28 under tension at all times so that the armature is held away from the magnet a distance limited by the setting of the screw 27.

The spacing of the armature arm from the magnet, therefore, determines the time interval from the initial electrical impulse to the releasing of the shutter and this interval can be minutely adjusted by means of the screw 27. This interval is important since it must correspond to the time characteristic of the particular flash bulb being used in order that the shutter will operate in exact synchronism with the flash.

After once being set for the mark and style of bulb the bail can be removed and replaced on the shutter lever when desired with assurance that the correct setting will be retained.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A mechanism for operating a camera shutter lever in consequence of an electric current comprising: a magnet housing; an electro-magnet in said housing; an armature member hinged over said magnet; an adjustable member slidably carried in a receiving socket in said armature member and projecting beyond the extremity thereof; means for locking said adjustable member in any desired extended position; and a bail carried by said adjustable member for engaging the shutter operating lever of the camera.

2. A mechanism for operating a camera shutter lever in consequence of an electric current comprising: a magnet housing; an electro-magnet in said housing; an armature member hinged over said magnet; an adjustable member slidably carried in a receiving socket in said armature member and projecting beyond the extremity thereof; means for locking said adjustable member in any desired extended position; and a bail carried by said adjustable member for engaging the shutter operating lever of the camera, said bale being hinged so that it may be swung into engagement with said shutter lever when desired.

3. A mechanism for operating a camera shutter lever in consequence of an electric current comprising: a magnet housing; an electro-magnet in said housing; an armature member hinged over said magnet; a sliding member mounted on said armature member; a looped bail hingedly secured to said sliding member for engaging the shutter lever of said camera; and means for locking said sliding member at any desired degree of extension from said armature member.

SIDNEY O. LINDAHL.